United States Patent [19]

Wahl et al.

[11] Patent Number: 4,755,313

[45] Date of Patent: Jul. 5, 1988

[54] INSULATING DEVICE

[75] Inventors: Georg Wahl, Eppelheim; Franz Schmaderer, Heidelberg; Cord-Henrich Dustmann, Weinheim; Harald Reiss, Heidelberg; Botho Ziegenbein, Neckarsteinach, all of Fed. Rep. of Germany

[73] Assignee: Brown, Boveri & Cie AG, Mannheim-Käfertal, Fed. Rep. of Germany

[21] Appl. No.: 763,829

[22] Filed: Aug. 8, 1985

[30] Foreign Application Priority Data

Aug. 8, 1984 [DE] Fed. Rep. of Germany ....... 3429151

[51] Int. Cl.⁴ .............................................. F16L 59/05
[52] U.S. Cl. ..................................... 252/62; 217/128; 220/3.1; 220/421; 220/423; 220/424; 220/469; 220/DIG. 9; 312/214; 428/388; 428/605; 428/608; 428/920

[58] Field of Search .................. 252/62; 428/388, 605, 428/608, 920; 220/3.1, 421, 423, 424, 469, DIG. 9; 312/214; 217/128

[56] References Cited

U.S. PATENT DOCUMENTS

| | | | |
|---|---|---|---|
| 2,967,152 | 1/1961 | Matsch et al. | 252/62 |
| 3,357,587 | 12/1967 | Weishaupt | 220/423 |
| 3,410,443 | 11/1968 | Hofmann | 252/62 |
| 3,948,295 | 4/1976 | Lemont et al. | 428/608 |
| 4,403,023 | 9/1983 | Reiss | 220/3.1 |

FOREIGN PATENT DOCUMENTS

| | | | |
|---|---|---|---|
| 3305375 | 8/1984 | Fed. Rep. of Germany | 252/62 |
| 110483 | 7/1983 | Japan | 252/62 |

Primary Examiner—Robert Wax
Attorney, Agent, or Firm—Herbert L. Lerner; Laurence A. Greenberg

[57] ABSTRACT

Insulating device for high and low temperatures with at least one insulating material, characterized by the feature that the insulating material is formed at least in part of total reflecting fibers.

3 Claims, 1 Drawing Sheet

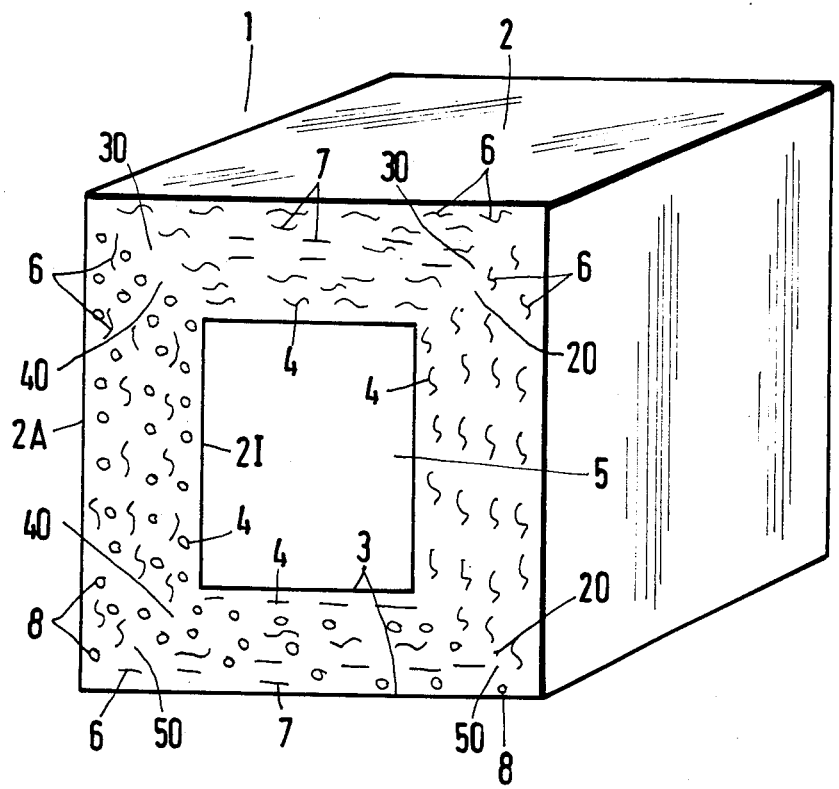

INSULATING DEVICE

BACKGROUND OF THE INVENTION

1. Field of the Invention

The invention relates to an insulating device for use in connection with high and low temperatures. Such insulating devices are applied where the objective is to keep materials or equipment at a predetermined high or low temperature.

2. Description of the Prior Art

German Published Non-Prosecuted Application (DE-OS) No. 32 35 708 discloses a thermal insulation device which is arranged around a high-temperature storage battery. Storage cells of the sodium-and-sulfur type which operate at a temperature of 350° C. are in the interior of the insulation. The insulation is formed by a double-wall housing with an evacuated space between the inner and the outer housing wall which space is filled with insulating material. In the device described there, the insulating material is in the form of powder and fibers. The powdered material is preferably one or several infrared-optical opacifier 5. Borosilicate glass fibers are used as the fiber material. With this ceramic insulating material, thermal conductivities of 2 to 8 mW/(mK) can be achieved at high temperatures in a vacuum and under external atmospheric pressure.

SUMMARY OF THE INVENTION

It is an object of the invention to provide an insulating device which can be pressure-stressed, i.e. subjected to pressure loads, has a thermal conductivity which falls below a value of 1 mW/(mK) at high temperatures, and in addition, can be employed in the high and the low-temperature range.

With the foregoing and other objects in view, there is provided in accordance with the invention, an insulating device for high and low temperatures comprising an enclosure containing insulating material, the insulating material formed at least in part of total-reflecting fibers.

Other features which are considered as characteristic for the invention are set forth in the appended claims.

Although the invention is illustrated and described herein as embodied in insulating device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawing which diagrammatically illustrates a vertical section through the insulating device in accordance with the invention in which the space between outer and inner walls of a double-walled housing is filled with insulating material which are formed at least in part from total-reflecting fibers made of metal or metal-coated, non-metallic fibers.

DESCRIPTION OF THE PREFERRED EMBODIMENTS

The invention relates to an insulating device for high and low temperatures. The insulating device is preferably formed by a double-walled housing, between the outer and inner housing walls of which an evacuated space is provided, into which the insulating material is filled. According to the invention, metallic or metal-coated fibers are used for this purpose. The coated fibers are made of a glass, plastic or ceramic material and are subsequently coated with aluminum or another metal. Instead of an insulating material consisting exclusively of metallic or metal-coated fibers, a mixture of these fibers and conventional fibers of glass, plastic or ceramic can also be used. A mixture of metallic or metal-coated fibers and a powder can also be employed. Good insulating effects are obtained with an insulating material which is composed of powder, conventional fibers and metallic or metal-coated fibers.

The insulating material consists of at least in part of metallic fibers. These have total-reflection properties. Metal-coated fibers can also be used as the insulating material. Such metal-coated fibers have the same total-reflection properties as purely metallic fibers. These fibers are made of glass, plastic or ceramic material and are subsequently coated with aluminum or another metal with reflective properties. In the fabrication of the insulating device, these metallic or metal-coated fibers are filled preferably into an evacuated space which surrounds the interior of the the insulating device on all sides.

In another embodiment of the invention, the insulating material can also be formed by a mixture of conventional fibers and metallic or metal-coated fibers. The preferred conventional fibers are fibers of glass, plastic or ceramic. In the design of an insulating device with such insulating material, up to 99 percent by weight of conventional fibers are mixed with metallic or metal-coated fibers, the weight relating to the total weight of the insulating material used.

The insulating material used for the insulating device according to the invention can also consist, if the situation so requires, of metallic or metal-coated fibers and an insulating powder, the amount of the powder used being up to 99 percent by weight based on the total weight of the insulating material used.

The insulating material of an insulating device may also contain a powder, conventional fibers and metallic or metal-coated fibers. The content of conventional fibers and powder may be up to 99 percent by weight based on the total weight of the insulating material used, with the remainder being metallic or metal-coated fibers. The preferred insulating powders are those which have the chemical composition $SiO_2$, $Al_2O_3$ or $TiO_2$ and a particle size of at most between 1 and 3 $\mu$m. The insulating device according to the invention can be used for superconductors as well as for high-temperature storage batteries.

In the following, the invention will be explained in detail, making reference to the drawing.

The sole figure shows a vertical section through the insulating device 1 which is bounded against the outside by a double-walled housing 2. The housing 2 is formed by two prismatic bodies of metal of different dimension, the smaller body being arranged concentrically in the larger one. Between the outer housing wall 2A and the inner housing wall 2I, there is a space 3 which is filled with insulating material 4. The outer and inner housing walls 2A and 2I of the insulating device 1 are gas-tight, to permit space 3 to be evacuated. In the embodiment example shown here, space 3 has at most a residual gas pressure of 10 Pa. The interior 5 of the insulating device 1 serves for receiving equipment (not shown here) or a solid or gaseous substance (not shown here) which is to be kept at a defined temperature. It does not matter whether very high or very low temperatures are to be maintained by the insulating device 1. The insulating material used for the insulation contains metallic or metal-coated fibers 6. These fibers are made either of pure metal or of a glass, plastic or ceramic material with a metallic coating which consists of aluminum or another metal. Due to this coating, these metal-coated fibers 6 as well as the fibers 6 made of metal exhibit total reflection. Instead of these metallic or metal-coated fibers 6, a mixture of conventionally known fibers which are made of glass, ceramic or plastic and the metallic or metal coated fibers 6 can be used for the insulating material. In an example of the use of such an insulating material 4, the content of the metallic or metal-coated fibers 6 is 1-100th of the insulating material 4, while the remaining amount is formed by the conventional fibers 7.

The insulating material can also consists of a mixture of a powdered material and metallic or metal-coated fibers. In this case, up to 99 percent by weight of a powder 8 based on the total weight of the insulating material used are admixed with the fibers 6. $Al_2O_3$, $SiO_2$ or $TiO_2$ are particularly well suited for use as the powder 8. A mixture of the above-mentioned materials in powder form can also be used. The insulating powder has a particle size between 1 and 3 $\mu$m.

To illustrate the variety of useable insulating materials 4, the region 20 of the space 3 is filled exclusively with metallic or metal-coated fibers in the insulating device shown. The region 30 contains an insulating material 4 which is formed by a mixture of conventional fibers 7 and metallic or metal-coated fibers 6. The region 40 of the space 3 contains an insulating material 4 which consists of a powder 8 and metallic or metal-coated fibers 6. The region 50 is filled with an insulating material 4 which is formed by metallic or metal-coated fibers 6, conventional fibers 7 and one or more powders 8.

Normally, the insulating device 1 according to the invention is made so that the space 3 is filled with only one of the four insulating materials 4 described for illustration in connection with regions 20, 30, 40 and 50.

Preferably, the space 3 is filled exclusively with metallic or metal-coated fibers 6.

The foregoing is a description corresponding, in substance, to German application No. P 34 29 151.2, dated Aug. 8, 1984, International priority of which is being claimed for the instant application, and which is hereby made part of this application. Any material discrepancies between the foregoing specification and the specification of the aforementioned corresponding German application are to be resolved in favor of the latter.

There is claimed:

1. Insulating device for high and low temperatures comprising an enclosure containing insulating material, said insulating material is formed of a mixture consisting in part of totally reflecting non-metallic fibers made of glass, plastic or ceramic which are coated with aluminum, which individual totally reflecting non-metallic fibers are not fabricated into a coherent layer, and the totally reflecting non-metallic fibers mixed with greater than zero to 99 percent of an insulating powder consisting of $SiO_2$, $Al_2O_3$ or $TiO_2$ or a mixture of these materials, based on the weight of the insulating material.

2. Insulating device for high and low temperatures comprising an enclosure containing insulating material, said insulating material is formed of a mixture consisting in part of totally reflecting non-metallic fibers made of glass, plastic or ceramic which are coated with aluminum, which individual totally reflecting non-metallic fibers are not fabricated into a coherent layer, and the totally reflecting non-metallic fibers mixed with greater than zero to 99 percent of non-metallic fibers made of glass, ceramic or plastic, based on the weight of the insulating material.

3. Insulating device for high and low temperatures comprising an enclosure containing insulating material, said insulating material is formed of a mixture consisting in part of totally reflecting non-metallic fibers made of glass, plastic or ceramic which are coated with aluminum, which individual totally reflecting non-metallic fibers are not fabricated into a coherent layer, and the totally reflecting non-metallic fibers mixed with greater than zero to 99 percent of an insulating powder consisting of $SiO_2$, $Al_2O_3$ or $TiO_2$ or a mixture of these materials, and non-metallic fibers made of glass, ceramic or plastic, based on the weight of the insulating material.

* * * * *